US009658608B2

(12) United States Patent
Nagaoka

(10) Patent No.: US 9,658,608 B2
(45) Date of Patent: May 23, 2017

(54) SERVO CONTROL APPARATUS

(71) Applicant: Mitsubishi Electric Corporation, Chiyoda-ku (JP)

(72) Inventor: Kotaro Nagaoka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/760,585

(22) PCT Filed: Sep. 26, 2013

(86) PCT No.: PCT/JP2013/076140
§ 371 (c)(1),
(2) Date: Jul. 13, 2015

(87) PCT Pub. No.: WO2014/141515
PCT Pub. Date: Sep. 18, 2014

(65) Prior Publication Data
US 2015/0355607 A1 Dec. 10, 2015

(30) Foreign Application Priority Data

Mar. 14, 2013 (JP) ................. 2013-052004

(51) Int. Cl.
G05B 13/04 (2006.01)
H02P 29/00 (2016.01)
G05B 19/19 (2006.01)

(52) U.S. Cl.
CPC ........... G05B 13/042 (2013.01); G05B 19/19 (2013.01); H02P 29/00 (2013.01); G05B 2219/41148 (2013.01)

(58) Field of Classification Search
CPC ............... G05B 11/36; G05B 19/404
See application file for complete search history.

(56) References Cited

U.S. PATENT DOCUMENTS

| 8,508,171 | B2 | 8/2013 | Miyaji | |
| 2002/0151988 | A1* | 10/2002 | Shiba | G05B 19/404 700/13 |
| 2008/0203959 | A1* | 8/2008 | Norihisa | H02P 23/18 318/630 |

(Continued)

FOREIGN PATENT DOCUMENTS

| JP | 3 32550 | 2/1991 |
| JP | 7 266190 | 10/1995 |

(Continued)

OTHER PUBLICATIONS

JP 2004-321000.*

(Continued)

Primary Examiner — Shawki S Ismail
Assistant Examiner — Muhammad S Islam
(74) Attorney, Agent, or Firm — Oblon, McClelland, Maier & Neustadt, L.L.P.

(57) ABSTRACT

A servo control apparatus includes: a model-response calculating unit; a motor-end-movement-amount-during-stopping measuring unit that measures a motor end movement amount during stopping, which is a displacement amount of a detection value of a motor end position in a period from when the calculated value of the machine end position changes to zero until the calculated value changes to a value other than zero; and an error-correction-amount calculating unit that calculates an error correction amount on the basis of a parameter in which a maximum change amount of a deviation between the machine end position and the motor end position during moving direction reversal is set in advance, the calculated value of the machine end position, and the motor end movement amount. The servo control unit sets the detection value of the machine end position and the detection value of the motor end position.

5 Claims, 5 Drawing Sheets

(56) References Cited

U.S. PATENT DOCUMENTS

| | | | | |
|---|---|---|---|---|
| 2010/0295495 A1* | 11/2010 | Iwashita | ................ | G05B 19/19 318/561 |
| 2011/0246132 A1* | 10/2011 | Sato | ........................ | B23Q 5/28 702/150 |
| 2012/0194121 A1* | 8/2012 | Miyaji | ................. | G05B 19/404 318/615 |

FOREIGN PATENT DOCUMENTS

| | | |
|---|---|---|
| JP | 2000 10612 | 1/2000 |
| JP | 2000 35814 | 2/2000 |
| JP | 2002 297241 | 10/2002 |
| JP | 2004 234205 | 8/2004 |
| JP | 2004 321000 | 11/2004 |
| JP | 2007 58277 | 3/2007 |
| JP | 2007 58278 | 3/2007 |
| JP | 2010 49599 | 3/2010 |
| JP | 2012 108892 | 6/2012 |
| JP | 2012 118785 | 6/2012 |
| JP | 2012 168926 | 9/2012 |

OTHER PUBLICATIONS

Combined Taiwanese Office Action and Search Report Issued Apr. 15, 2015 in Taiwanese Patent Application No. 102147143 (with English translation) (Total 9 pages).
International Search Report Issued Oct. 22, 2013 in PCT/JP2013/076140 Filed Sep. 26, 2013.
Chinese Office Action dated Nov. 30, 2016, issued in Chinese Patent Application No. 201380074480.X (with English translation).

* cited by examiner

SERVO CONTROL APPARATUS

FIELD

The present invention relates to a servo control apparatus that drives servomotors.

BACKGROUND

In the FA field, driving control of a machine tool is performed such that the movement of a table or a tool for fixing a workpiece (work) follows a command. Control for driving a machine such that a tool position (i.e., the relative position of the tool to the work) accurately follows a command route (a command track) is called tracking control (or contour motion control). The tracking control is precisely performed using a numerical control apparatus or a servo control apparatus attached to the numerical control apparatus. The control target machine tool includes a plurality of shafts, each shaft respectively driven by a servomotor. The individual servomotors are respectively driven using servo control apparatuses.

Friction, backlash, and lost motion present in a machine system disturb the tracking control. When the moving direction of a feed shaft is reversed, the directions in which these disturbances act are reversed. The influence of the reversal of the directions conspicuously appears in tracking errors. A typical error, which occurs when an arcuate track is being followed, is a tracking error that occurs when the moving direction of the feed shaft is reversed in a quadrant switching portion of the arcuate track. The tracking error is called quadrant projection because a track has a shape projecting as a protrusion to the outer side when the error amount in the radial direction is enlarged and plotted. The occurrence of the tracking error of the track like the quadrant projection during machining is undesirable because streaks and flaws occur in the machining result.

Therefore, for example, a virtual feeding mechanism is incorporated and a correction command is calculated from the difference in the torque command signal between the virtual feeding mechanism and the actual feeding mechanism, and this is added to an actual torque command or frictional force or frictional torque that occurs before and after reversal of the motion direction of the feeding driving mechanism is estimated; a motor torque error is extracted; and torque compensation is performed according to an error signal (e.g., Patent Literature 1).

CITATION LIST

Patent Literature

Patent Literature 1: Japanese Patent Application Laid-Open No. 2010-49599

SUMMARY

Technical Problem

However, according to the technology of Patent Literature 1, an effect of the correction command appears after a difference occurs in actual torque and model torque. Therefore, there is a problem in that the correction comes into effect late. According to the technology of Patent Literature 1, although a friction compensation signal is generated on the basis of direction reversal of a position command, in the case of full-closed control, the shift of the position between a motor end and a machine end affects the full-closed control. Therefore, there is a problem in that an effect is not sufficiently obtained only by torque compensation. Further, in the case of the full-closed control, the shift of the position between the motor end and the machine end affects the magnitude of the tracking error during reversal of the moving direction. Therefore, there is a problem in that, depending on the command route, the compensation effect is not sufficiently obtained.

The present invention has been devised in view of the above and it is an objective of the present invention to obtain a servo control apparatus that enables full-closed control in which a tracking error between a machine end position and a command position is reduced even when the moving direction of a feed shaft is reversed.

Solution to Problem

In order to solve the problem and achieve the objective mentioned above, the present invention relates to a servo control apparatus that includes: a servo control unit that calculates, using a detection value of a machine end position, which is a position of a machine system, and a detection value of a motor end position, which is a position of a motor that drives the machine system as a position feedback, a torque command for the motor such that the machine end position follows a position command; a model-response calculating unit that calculates a calculated value of the machine end position on the basis of the position command; a motor-end-movement-amount-during-stopping measuring unit that measures a motor end movement amount during stopping, which is a displacement amount of the detection value of the motor end position in a period from when the calculated value of the machine end position changes to a zero until the calculated value changes to a value other than the zero; and an error-correction-amount calculating unit that calculates an error correction amount on the basis of a parameter in which a maximum change amount of a deviation between the machine end position and the motor end position during reversal of a moving direction of a feed shaft is set in advance, the calculated value of the machine end position, and the motor end movement amount during stopping. The servo control unit calculates the torque command using the error correction amount.

Advantageous Effects of Invention

According to the present invention, the torque command is calculated using the error correction amount calculated on the basis of the maximum change amount of the deviation between the machine end position and the motor end position during the reversal of the moving direction of the feed shaft. Therefore, when deviation between the motor end position and the machine end position suddenly changes during the reversal of the moving direction, it is possible to reduce the tracking error with respect to a command position of the machine end position that occurs after the moving direction reversal. The error correction amount is calculated taking into account the motor end movement amount while the motor stops. Therefore, even when a command for a temporary stop before the moving direction reversal is given, it is still possible to reduce a tracking error with respect to the command position of the machine end position that occurs after the moving direction reversal. The error correction amount is calculated taking into account the motor end movement amount while the motor is stopping. Therefore, when the deviation between the motor end position and the machine end position gently changes during the reversal of the moving direction, it is possible to prevent a situation in which the error correction amount acts too early, the correction of the position has an excessive effect after the moving direction reversal, and a tracking error occurs. That is, according to the present invention, it is possible to provide the servo control apparatus that enables full-closed control in which a tracking error between the machine end position and the command position is reduced even when the moving direction of the feed shaft is reversed.

DESCRIPTION OF EMBODIMENTS

Exemplary embodiments of the present invention are explained in detail below with reference to the drawings. Note that the present invention is not limited by the embodiments.

First Embodiment

Figure 1:
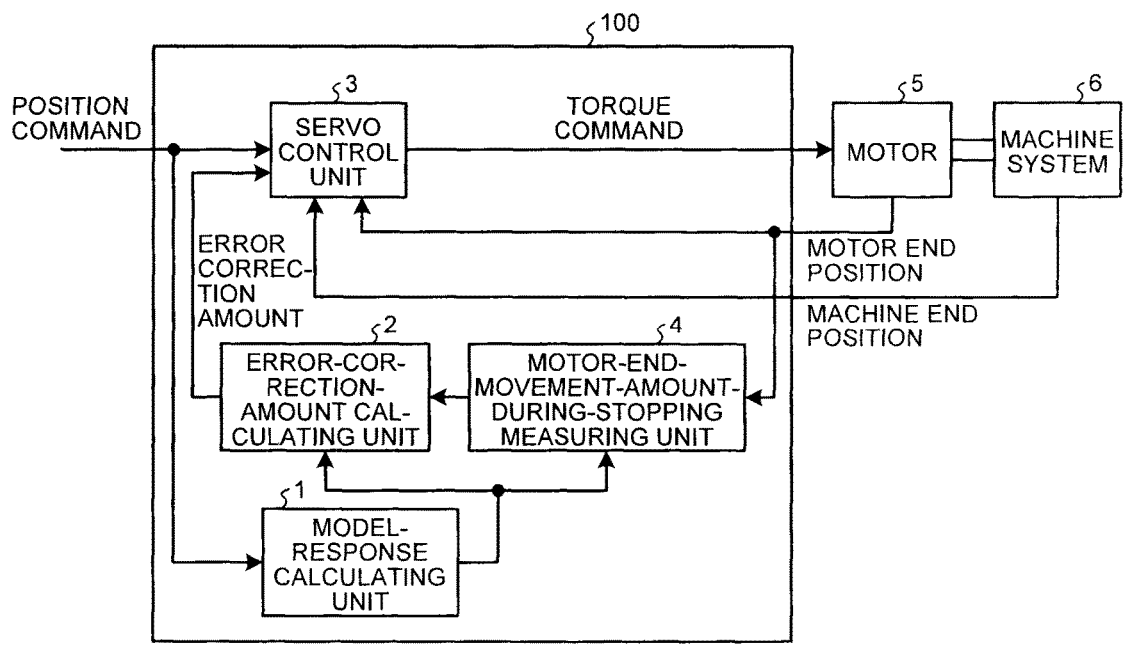
FIG. 1 is a diagram illustrating the configuration of a servo control apparatus in a first embodiment.

FIG. 1 is a diagram illustrating the configuration of a servo control apparatus in a first embodiment of the present invention. As illustrated in the figure, a servo control apparatus 100 is connected to a motor 5 and a machine system 6.

Figure 2:
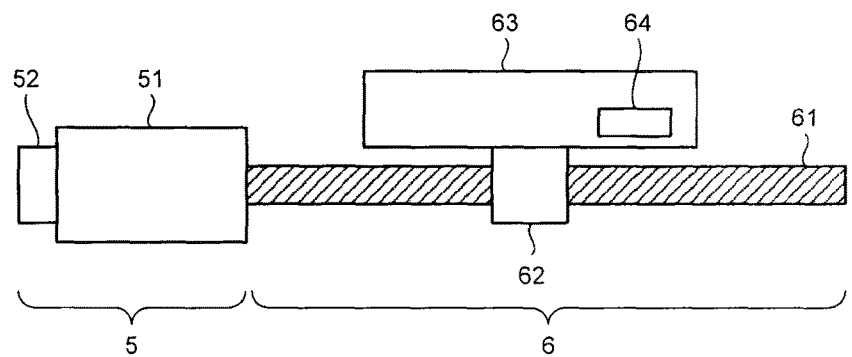
FIG. 2 is a diagram illustrating the configuration of a motor and a machine system.

FIG. 2 is a diagram illustrating the configuration of the motor 5 and the machine system 6. The motor 5 includes a servomotor 51 and a motor-end-position detector 52 that detects a motor end position of the servomotor 51 (the position of the motor 5). As the motor-end-position detector 52, for example, a rotary encoder is used. The machine system 6 includes a ball screw 61, a nut 62, and a table 63 movable integrally with the nut 62 and is connected to the servomotor 51. A machine-end-position detector 64 that detects the position of the table 63 (the position of the machine system 6) as a machine end position is attached to the table 63. As the machine-end-position detector 64, for example, a linear scale is used. Note that a position directly detected in the motor-end-position detector 52 is a rotation angle of the motor 5. The angle can be converted into the length in a moving direction of the table 63 by multiplying the angle with a ball screw lead, which is the table moving distance per one rotation of the motor, and dividing a product by an angle 2π (rad) of one turn of the motor. In the following explanation, a value converted into the length in the table moving direction is used as the motor end position.

A position command is input to the servo control apparatus 100. The machine end position detected by the machine-end-position detector 64 and the motor end position detected by the motor-end-position detector 52 are also input into the servo control apparatus 100. The servo control apparatus 100 generates, while using a detection value of the machine end position and a detection value of the motor end position as position feedback, a torque command value of the motor 5 such that the detection value of the machine end position follows the position command. The servo control apparatus 100 outputs the generated torque command value to the motor 5.

The servo control apparatus 100 includes a model-response calculating unit 1, an error-correction-amount calculating unit 2, a servo control unit 3, and a motor-end-movement-amount-during-stopping measuring unit 4 as components for generating a torque command value.

A position command is input to the model-response calculating unit 1. The model-response calculating unit 1 outputs a result (a model response), obtained by simulating a response of the machine system 6, to the position command. The output model response is a simulation value (a calculated value) of the machine end position generated on the basis of the position command.

Figure 3:
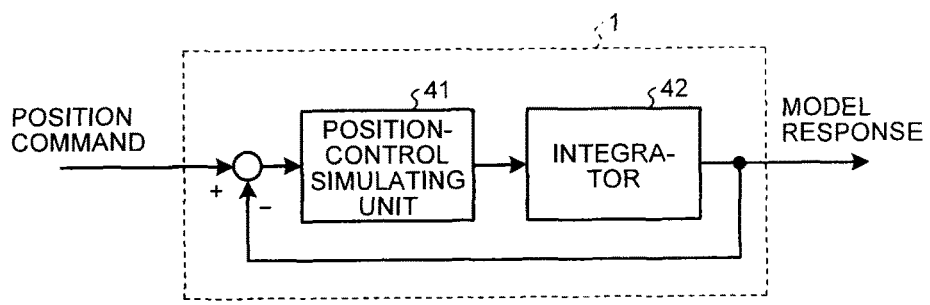
FIG. 3 is a block diagram illustrating the internal configuration of a model-response calculating unit.

FIG. 3 is a block diagram illustrating the internal configuration of the model-response calculating unit 1. The model-response calculating unit 1 includes a position-control simulating unit 41 and an integrator 42. The position-control simulating unit 41 applies arithmetic processing, which is the same as the arithmetic processing of a position control unit 31 explained later, in order to obtain a difference between a position commanded by the position command and a model response output by the integrator 42 and outputs a velocity command of the machine end position. The integrator 42 integrates the output of the position-control simulating unit 41 to thereby calculate the model response and outputs the model response.

The detection value of the motor end position is input to the motor-end-movement-amount-during-stopping measuring unit 4 from the motor 5. The model response is input to the motor-end-movement-amount-during-stopping measuring unit 4 from the model-response calculating unit 1. The motor-end-movement-amount-during-stopping measuring unit 4 measures and outputs a displacement amount of the motor end position while the model response is stopping (a motor end movement amount during stopping).

More specifically, the motor-end-movement-amount-during-stopping measuring unit 4 calculates the motor end movement amount during the stopping as explained below. When model velocity (obtained by time-differentiating the model response) changes to 0, the motor-end-movement-amount-during-stopping measuring unit 4 temporarily stores a motor end position at that point in time. Thereafter, when the model velocity changes to a value other than 0, the motor-end-movement-amount-during-stopping measuring unit 4 outputs the difference between a motor end position at that point in time and the temporarily stored motor end position. At a time other than when the model velocity changes from 0 to a value other than 0, the motor-end-movement-amount-during-stopping measuring unit 4 outputs a value that is same as a value of an output at the immediately preceding control cycle.

Note that, for example, for determination of whether the model velocity is 0, the motor-end-movement-amount-during-stopping measuring unit 4 uses a threshold of velocity and a threshold of time that are set in advance. First, a state of velocity zero is defined as a state in which an absolute value of the model velocity is equal to or smaller than the threshold of velocity. Then, when the state, during which the absolute value of the model velocity is equal to or smaller than the threshold of velocity, continues for time equal to or longer than the time set by the threshold of time, the motor-end-movement-amount-during-stopping measuring unit 4 determines that the model velocity is 0. As the threshold of velocity and the threshold of time, positive constants of approximately minimum resolution of velocity and a sampling cycle are respectively used. Because the thresholds are set in this way, it is possible to prevent erroneous determination of a movement state due to a calculation error or the like.

The motor end movement amount during stopping is input to the error-correction-amount calculating unit 2 from the motor-end-movement-amount-during-stopping measuring unit 4. The model response is input to the error-correction-amount calculating unit 2 from the model-response calculating unit 1. The error-correction-amount calculating unit 2 calculates an error correction amount on the basis of a parameter set in advance, the model response, and the motor end movement amount during stopping and outputs the error correction amount.

Figure 4:
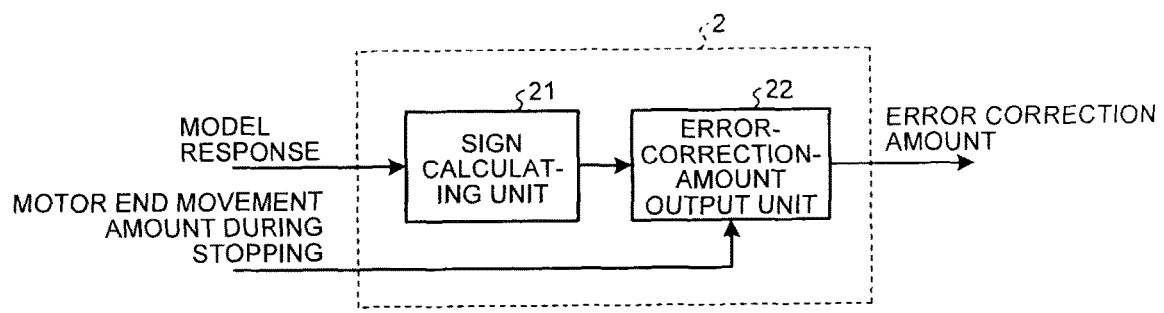
FIG. 4 is a block diagram illustrating the internal configuration of an error-correction-amount calculating unit.

FIG. 4 is a block diagram illustrating the internal configuration of the error-correction-amount calculating unit 2. The error-correction-amount calculating unit 2 includes a sign calculating unit 21 and an error-correction-amount output unit 22. The sign calculating unit 21 calculates the sign of a change ratio of an output of the model-response calculating unit 1, i.e., the sign of the model velocity. Specifically, the sign calculating unit 21 outputs 1 when the model velocity is plus and outputs a value of −1 when the model velocity is minus. When the model velocity is 0, the sign calculating unit 21 outputs a sign immediately before the model velocity changes to 0. Therefore, the output of the sign calculating unit 21 can take 1 or −1. Note that the determination concerning whether the model velocity is 0 can be performed by a method the same as the method performed by the motor-end-movement-amount-during-stopping measuring unit 4.

When the output of the sign calculating unit 21 changes, i.e., when the output from the sign calculating unit 21 changes from 1 to −1 or from −1 to 1, the error-correction-amount output unit 22 changes the error correction amount. The change amount of the error correction amount by the error-correction-amount output unit 22 is a value obtained by subtracting the motor end movement amount during stopping from a value retained as a parameter in advance. The direction in which the error-correction-amount output unit 22 changes the error correction amount is the same as the direction in which the output of the sign calculating unit 21 changes. That is, the error-correction-amount output unit 22 reduces the error correction amount when the output of the sign calculating unit 21 changes from 1 to −1 and increases the error correction amount when the output of the sign calculating unit 21 changes from −1 to 1. The parameter retained in the error-correction-amount output unit 22 is a maximum change amount of the deviation between the machine end position and the motor end position during the reversal of the moving direction of a feed shaft. Details of the parameter are explained below. The error correction amount changes stepwise when the moving direction of the feed shaft (i.e., a moving direction of the nut 62 and the table 63) is reversed.

Figure 5:
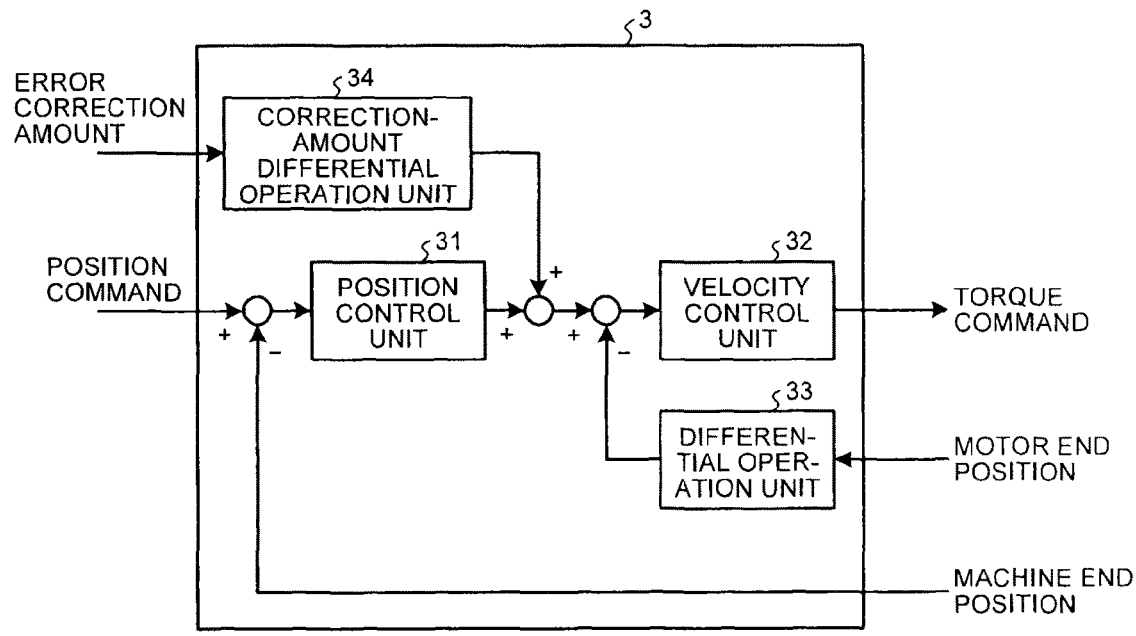
FIG. 5 is a block diagram illustrating the internal configuration of a servo control unit.

FIG. 5 is a block diagram illustrating the internal configuration of the servo control unit 3. The servo control unit 3 includes a position control unit 31, a velocity control unit 32, a differential operation unit 33, and a correction-amount differential operation unit 34.

The difference (a position deviation) between the position command and the machine end position is input to the position control unit 31. The position control unit 31 executes predetermined position control processing such as proportional control using the position deviation to calculate a velocity command and outputs the velocity command. Alternatively, the error correction amount is differentiated in the correction-amount differential operation unit 34. The motor end position is differentiated in the differential operation unit 33. Note that these kinds of differential processing are replaced with difference processing in a discrete time system. That is, a value obtained by dividing a difference between the present motor end position and a motor end position of an immediately preceding sample by a control processing cycle is used as an approximate differential value.

As explained above, the error correction amount is a stepwise signal. Therefore, when the error correction amount is differentiated, the stepwise signal is differentiated into an impulse-like signal. This is sometimes undesirable. In such a case, a pseudo differential is executed instead of the differential in the correction-amount differential operation unit 34. Specifically, the correction-amount differential operation unit 34 performs difference processing of the error correction amount and operates as a low-pass filter having a predetermined time constant on the error correction amount after the difference processing thereby making an impulse-like peak, which appears in an error signal correction amount after the difference processing, less sharp. When the time constant of the low-pass filter for the pseudo differential is represented by Td, a transfer function Gd(s) of the low-pass filter for the pseudo differential is expressed by the following Expression 1:

$$Gd(s)=1/(1+Td*s) \quad \text{(Expression 1)}$$

Note that the time constant Td of the low-pass filter for the pseudo differential is adjusted in advance such that the height of the peak of the signal after the pseudo differential is equal to or lower than a fixed level.

A value is obtained by subtracting an output of the differential operation unit 33 from the sum of the velocity commands, which is the output of the position control unit 31; and an output of the correction-amount differential operation unit 34 is input into the velocity control unit 32. The velocity control unit 32 applies predetermined velocity control processing such as proportional/integral control to the input value to thereby calculate a torque command and outputs the torque command.

The parameter set in the error-correction-amount output unit 22 and a principle that, by configuring the servo control apparatus 100 as explained above, a tracking error between the machine end position and the position commanded by the position command (the command position) can be reduced even when the moving direction of the feed shaft is reversed are explained below.

When a backlash (e.g., slack in the ball screw) is present in the machine system 6, a deviation having a magnitude the same as the backlash amount is present between the motor end position and the machine end position. Therefore, in a steady state of movement in the same direction, the motor end position follows the position command with a shift of a fixed amount equivalent to the backlash amount. A deviation between the motor end position and the machine end position, i.e., a relative position of the motor end position to the machine end position is referred to as machine deviation. The machine deviation is a fixed value in a case where the motion is at fixed velocity. A sign of the machine deviation changes according to a moving direction. That is, in the case of movement at fixed velocity in a positive direction, the machine deviation is positive because the motor end is in a position shifted a fixed amount equivalent to the backlash amount in the positive direction with respect to the machine end. Conversely, in the case of movement in a negative direction, the machine deviation is negative because the motor end is in a position shifted in the negative direction with respect to the machine end.

In a full-closed control system in which the machine end position is used as a feedback signal, the machine end position generally follows the position command. The motor end position is a position shifted from the command position by an amount of the machine deviation.

Because the sign of the machine deviation changes depending on the moving direction, when the moving direction is reversed, the machine deviation changes stepwise. Therefore, to realize the moving direction reversal of the machine end position without a track delay in the case of the full-closed control system, it is necessary to move the motor end position stepwise. However, actually, the motor end position cannot move stepwise and moves late at a velocity corresponding to a response time constant of the feedback control system. As a result, the moving direction reversal of the machine end position is delayed. A tracking error, which is an error of a transition position with respect to the command position, occurs.

The tracking error fluctuates according to the magnitudes of machine deviations before and after the moving direction reversal. That is, as a change in the machine deviations before and after the moving direction reversal becomes larger, the tracking error with respect to the command position of the machine end position becomes larger as well. The cause of the tracking delay of the machine end position is that the motor end position cannot change stepwise.

Therefore, to reduce the tracking error of the machine end position during the reversal of the moving direction, in the first embodiment, a difference between the machine deviation in the movement in the positive direction and the machine deviation in the movement in the negative direction (the maximum change amount of the deviation during the reversal of the moving direction of the feed shaft) is stored in advance as the parameter of the error-correction-amount output unit 22. The servo control unit 3 adds a stepwise correction amount, which has a value of the parameter as the height of a step, to the motor end position. That is, the parameter is a value obtained by adding up the backlash amount (an absolute value) at the time when the feed shaft is moved in the positive direction and the backlash amount (an absolute value) at the time when the feed shaft is moved in the negative direction. Note that, in the full-closed control system, the motor end position is differentiated once in the servo control unit 3 and added to the velocity command as a velocity feedback. Therefore, the correction amount is also configured to be differentiated once and added to the velocity command.

Furthermore, during the stopping, the full-closed control system only controls the machine end position such that it becomes a position that is the same as the command position, and it cannot directly control the machine deviation. Therefore, for example, when once stopped when the moving position is reversed, it is likely that the machine deviation changes during the stopping. Because the machine end position does not change during the stopping, it is possible to obtain the change in the machine deviation during the stopping by observing the change in the motor end position during the stopping.

Therefore, in the first embodiment, the motor-end-movement-amount-during-stopping measuring unit 4 calculates the motor end movement amount during stopping. The error-correction-amount output unit 22 sets the value of the change amount (the height of the step) of the error correction amount to the value obtained by subtracting the motor end movement amount during stopping from the value given by the parameter. Because the error-correction-amount output unit 22 sets, as the change amount of the error correction amount, the value obtained by subtracting the movement amount of the motor end during the stopping from the original parameter, even if fluctuations of the machine deviation occur during the stopping, it is possible to output the error correction amount having an appropriate magnitude corresponding to the machine deviation during the reversal of the moving direction.

Figure 6:
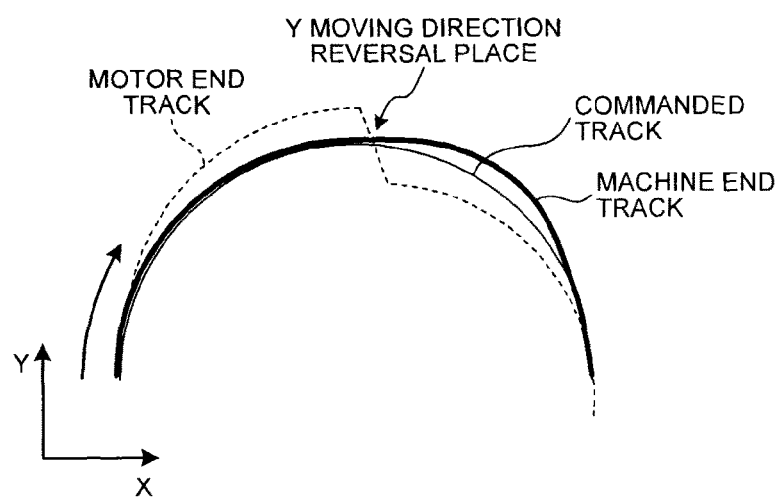
FIG. 6 is a diagram illustrating an example of a tracking error that occurs during reversal of a moving direction.
Figure 7:
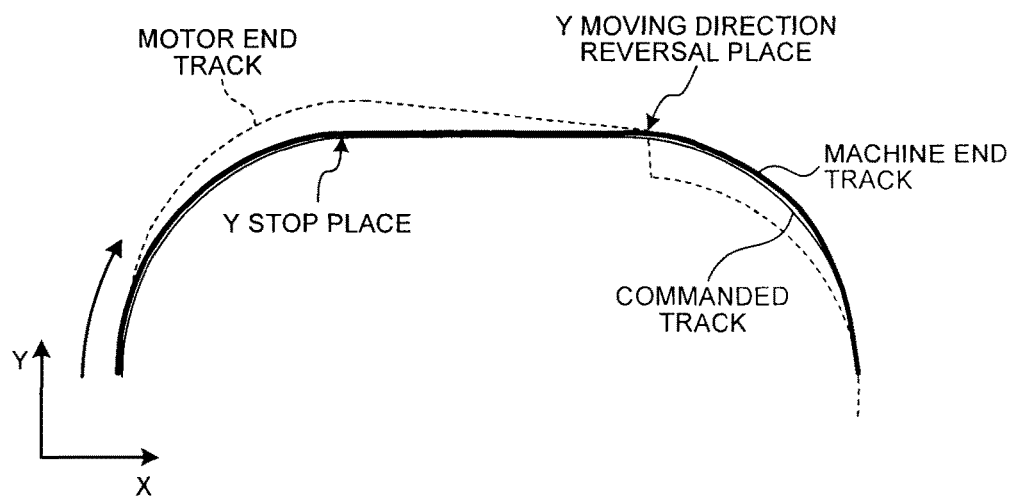
FIG. 7 is a diagram illustrating an example of a tracking error that occurs during the reversal of the moving direction.

FIG. 6 and FIG. 7 are diagrams illustrating examples of tracking errors that occur during the reversal of the moving direction. In the examples respectively illustrated in FIG. 6 and FIG. 7, it is assumed that arcuate shapes in an XY plane are commanded when an X-axis and a Y-axis are respectively controlled by independent servo control apparatuses 100. In FIG. 6 and FIG. 7, thin solid lines indicate the command tracks decided by command positions on the X axis and the Y axis. Broken lines indicate motor end tracks, which are tracks decided by motor end positions on the X axis and the Y axis. Thick solid lines indicate machine end tracks decided by the machine end position. In the example illustrated in FIG. 6, the command position on the Y axis does not stop in the case of a moving direction reversal on the Y axis. In the example illustrated in FIG. 7, the command position on the Y axis stops once in the case of the moving direction reversal on the Y axis.

In the case of the example illustrated in FIG. 6, there is a place where the moving direction on the Y axis is reversed halfway. A machine deviation on the Y axis is a positive fixed value until the moving direction reversal, which becomes a negative fixed value after the moving direction reversal. This occurs because backlash is present in the machine system on the Y axis and the motor end position needs to be moved ahead by an amount equivalent to the backlash to cause the machine end position to follow the command position. Because the deviation between the motor end position and the machine end position greatly changes during the reversal of the moving direction, a tracking error corresponding to the change appears as an error of the machine end track with respect to the command track.

The servo control apparatus 100 in the first embodiment stores in advance, as a parameter, the difference between the machine deviation during positive direction movement and the machine deviation during negative direction movement and, in the Y-axis moving direction reversal position, adds an error correction amount including a correction pulse having a magnitude corresponding to the difference to the position command. Consequently, the tracking error of the machine end track with respect to the command track during the reversal of the moving direction is reduced. Note that, in the case of the example illustrated in FIG. 6, during the reversal of the moving direction on the Y axis, the servo control apparatus 100 adds the error correction amount in the negative direction to the position command on the Y axis.

Furthermore, in the case of the example illustrated in FIG. 7, there is a place where the movement on the Y axis stops halfway. Furthermore, a place where the moving direction on the Y axis is reversed appears after the place. The machine deviation on the Y axis is a positive fixed value up to the stop place and shows behavior of approaching 0 little by little from the stop place to the moving direction reversal place. Subsequently, after the moving direction reversal place, the machine deviation is a negative fixed value. The machine deviation approaches 0 during the stopping because a spring element is present between the motor end and the machine end; and a twist caused by the spring element during the movement is reversed little by little during the stopping.

A tracking error occurs in the machine end track during the reversal of the Y-axis moving direction. However, because the change amount of the machine deviation is small compared with the case of FIG. 6, the tracking error of the machine end track is also small compared with the case of FIG. 6. When correction, the same as the correction in the case of the example illustrated in FIG. 6, is performed in the case illustrated in FIG. 7, the correction amount becomes excessively large.

The servo control apparatus 100 in the first embodiment measures the motor end movement amount during stopping and reduces the magnitude of the error correction amount output during the reversal of the moving direction by the motor end movement amount during stopping. Therefore, even if the machine deviation changes during the stopping, it is possible to reduce the tracking error of the machine end track with respect to the command track during the reversal of the moving direction. In the case of the example illustrated in FIG. 7, the servo control apparatus 100 adds the error correction amount in the negative direction to the position command on the Y axis during the reversal of the moving direction on the Y axis. The magnitude of the correction amount to be added at this point is smaller than the magnitude of the correction amount used in the case of FIG. 6 by the change amount of the motor end position from the stop to the moving direction reversal on the Y axis.

Figure 8:
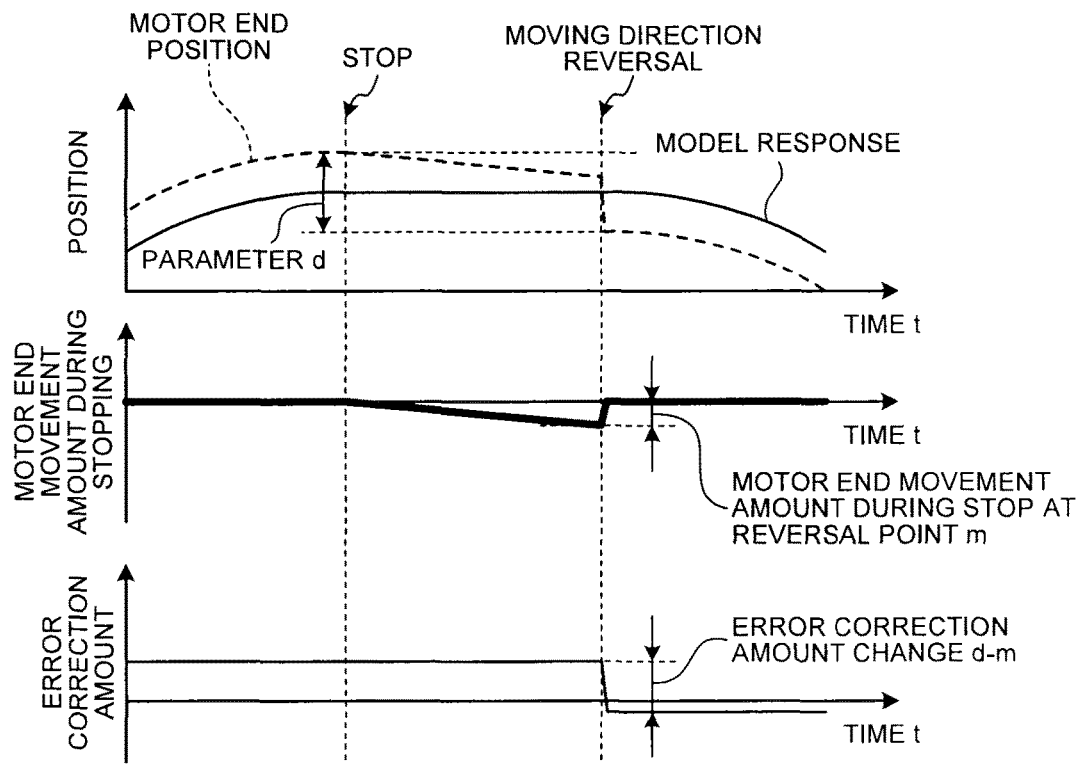
FIG. 8 is a diagram illustrating temporal changes of an error correction amount and signals related to the error correction amount during the moving direction reversal.

An example of temporal changes of the model response, the motor end position, the motor end movement amount during stopping, and the error correction amount on the Y axis in the example illustrated in FIG. 7 are illustrated in FIG. 8. When the movement of the model response stops, an integral of the motor end movement amount during stopping is started. Subsequently, when the moving direction changes from positive to negative, the error correction amount is changed to the negative direction. The change amount of the error correction amount at that point is a value obtained by subtracting a motor end movement amount during stopping m at a point in time of the reversal from a parameter d. After the moving direction is reversed, the motor end movement amount during stopping is reduced to zero and the error correction amount keeps a value after the change.

As explained above, according to the first embodiment, the servo control apparatus 100 includes the model-response calculating unit 1 that calculates the model response, which is a calculated value of the machine end position; the motor-end-movement-amount-during-stopping measuring unit 4 that measures the motor end movement amount during stopping, which is the displacement amount of a detection value of the motor end position in a period from time when the calculated value of the machine end position changes to zero until the calculated value changes to a value other than zero; and the error-correction-amount calculating unit 2 that calculates an error correction amount on the basis of a parameter set in advance indicating the maximum change amount of the deviation between the machine end position and the motor end position during the reversal of the moving direction of the feed shaft, the calculated value of the machine end position, and the motor end movement amount during stopping. The servo control unit 3 sets the detection value of the machine end position and the detection value of the motor end position as a position feedback and calculates a torque command using the error correction amount. According to the first embodiment, the torque command is calculated using the error correction amount calculated on the basis of the maximum change amount of the deviation between the machine end position and the motor end position during the reversal of the moving direction of the feed shaft. Therefore, when the deviation between the motor end position and the machine end position suddenly changes during the reversal of the moving direction, it is possible to reduce the tracking error with respect to a command position of the machine end position that is generated after the moving direction reversal. The error correction amount is calculated taking into account the motor end movement amount during stopping. Therefore, even when a command for a temporary stop before the moving direction reversal is given, it is possible to reduce the tracking error with respect to the command position of the machine end position that is generated after the moving direction reversal. The error correction amount is calculated taking into account the motor end movement amount during stopping. Therefore, when the deviation between the motor end position and the machine end position gently changes during the reversal of the moving direction, it is possible to prevent an occurrence of the situation in which the error correction amount acts too early, the correction of the position has an excessive effect after the moving direction reversal, and a tracking error occurs. As explained above, the servo control apparatus 100 in the first embodiment enables the full-closed control in which the tracking error between the machine end position and the command position is reduced even when the moving direction of the feed shaft is reversed.

Note that, specifically, the error-correction-amount calculating unit 2 calculates the sign of the velocity of the machine end on the basis of the model response and calculates the error correction amount by multiplying a value obtained by subtracting the parameter from the motor end movement amount during stopping with the sign. Therefore, even if the motor end position fluctuates during the stopping, it is possible to calculate as accurate an error correction amount as possible.

The servo control unit 3 includes the position control unit 31 that applies a predetermined position control operation to a difference between the position command and the detection value of the machine end position; the correction-amount-differential operation unit 34 that differentiates the error correction amount; the differential operation unit 33 that differentiates the detection value of the motor end position; and the velocity control unit 32 that applies a predetermined velocity control operation to a difference between a value obtained by adding an output of the correction-amount-differential operation unit 34 to an output of the position control unit 31 and an output of the differential operation unit 33 and that calculates a torque command. Consequently, the servo control apparatus 100 can control the machine end position such that it follows the position command by setting the difference between the position command and the machine end position as a position deviation and performing feedback control to reduce the position deviation.

Second Embodiment

A servo control apparatus in a second embodiment has a configuration basically the same as the configuration in the first embodiment. Components that are the same as the components in the first embodiment are denoted by names and reference numerals and signs that are the same as the names and the reference numerals and signs in the first embodiment. Redundant explanation of the components is omitted. Note that, according to the second embodiment, the configuration of a servo control unit is different from the configuration in the first embodiment. The servo control apparatus in the second embodiment is denoted by reference numeral 200 and the servo control unit in the second embodiment is denoted by reference numeral 7 so as to respectively distinguish between the servo control apparatus and the servo control unit in the first embodiment.

Figure 9:
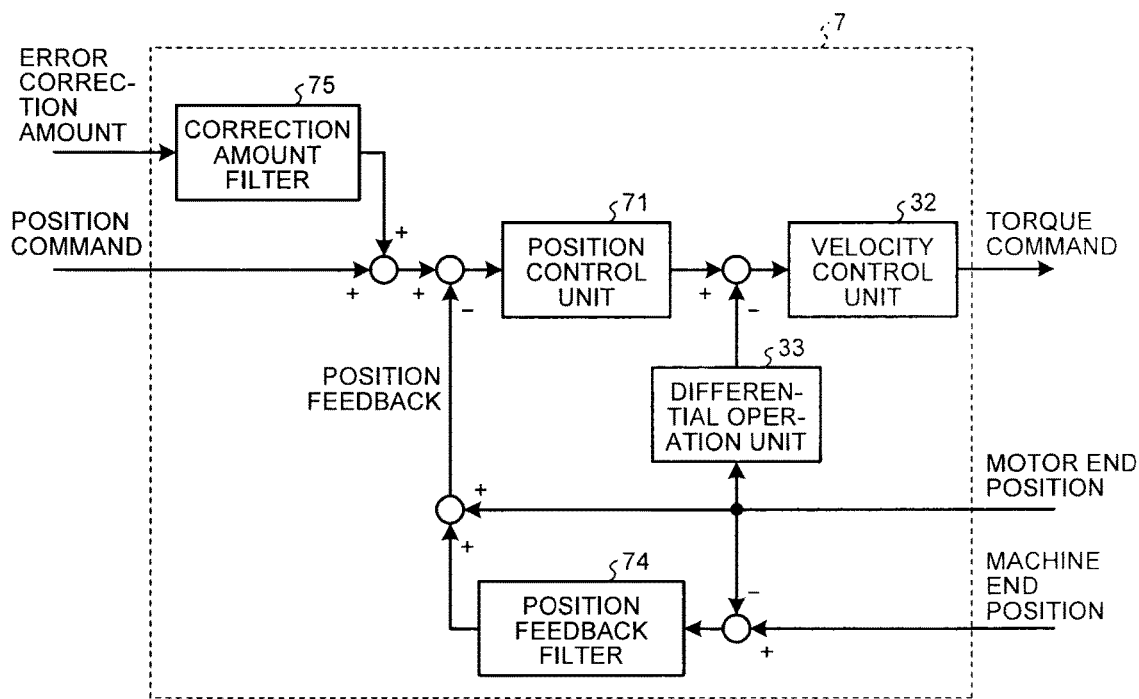
FIG. 9 is a block diagram illustrating the internal configuration of a servo control unit included in a servo control apparatus in a second embodiment.

FIG. 9 is a block diagram illustrating the internal configuration of the servo control unit 7 included in the servo control apparatus 200 in the second embodiment. The servo control unit 7 includes a position control unit 71, a velocity control unit 32, a differential operation unit 33, a position feedback filter 74, and a correction amount filter 75. The servo control unit 7 in the second embodiment includes the correction amount filter 75 instead of the correction-amount-differential operation unit 34. The servo control unit 7 is configured to add an output from the correction amount filter 75 to a position command. The servo control unit 7 in the second embodiment includes the position feedback filter 74. The servo control unit 7 inputs a difference between a machine end position and a motor end position to the position feedback filter unit 74 and uses, as a position feedback, a value obtained by adding the motor end position to an output of the position feedback filter 74. In other words, the servo control unit 7 uses, as a position deviation, a value obtained by subtracting the sum of the output of the position feedback filter 74 and the motor end position from the position command.

The position feedback filter 74 calculates the low-frequency component of the difference between the detection value of the machine end position and the detection value of the motor end position. Specifically, the position feedback filter 74 has the characteristics of a primary delay low-pass filter. When the time constant of the position feedback filter 74 is represented by Tf, the transfer function Gf(s) of the position feedback filter 74 is represented by the following Expression 2.

$$Gf(s)=1/(1+Tf^*s) \quad \text{(Expression 2)}$$

The correction amount filter 75 calculates a high-frequency component of the error correction amount. Specifically, the correction amount filter 75 has the characteristics of a primary high-pass filter. When the time constant of the correction amount filter 75 is represented by Tc, the transfer function Gc(s) of the correction amount filter 75 is represented by the following Expression 3:

$$Gc(s)=Tc^*s/(1+Tc^*s) \quad \text{(Expression 3)}$$

A servo control system for combining the motor end position and the machine end position and calculating the position feedback like the servo control unit 7 in the second embodiment is called dual feedback control. When the rigidity of the machine system is low, because the resonance mode of the machine system affects the position control loop, the control system tends to be unstable when the position loop gain is increased. Furthermore, when the motor end position is used as the position feedback, a positioning error occurs at the machine end because of a deviation between the machine end and the motor end. Therefore, according to the dual feedback control, a combination of a high-frequency component of the motor end position and a low-frequency component of the machine end position is used as the position feedback to attain both machining end positioning accuracy during the stopping and stability of the control loop during movement. That is, according to the dual feedback control, because the high-frequency component of the machine end position is removed, it is possible to reduce the influence of machine resonance that occurs during operation when the rigidity of the machine system is low. Because the machine end position is used as the position feedback during the stopping, it is possible to improve the machine end positioning accuracy.

Furthermore, according to the dual feedback control, the machine end position during the stopping or during constant velocity feeding follows the position command. However, when a machine deviation transitionally changes during the reversal of the moving direction, a tracking delay is generated at the machine end.

Figure 10:
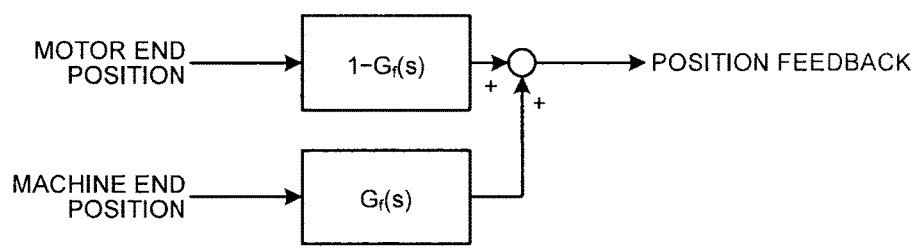
FIG. 10 is a diagram explaining a relation between a motor end position/a machine end position and position feedback.

FIG. 10 represents, using the transfer function Gf(s) of the position feedback filter, a relation between the motor end position/the machine end position and the position feedback. In the case of dual feedback control, the transfer function of the motor end position and the position feedback is obtained by subtracting the transfer function of the position feedback filter from 1. Specifically, the transfer function of the motor end position and the position feedback is a transfer function of a high-pass filter indicated by the following Expression 4:

$$1-Gf(s)=Tf^*s/(1+Tf^*s) \quad \text{(Expression 4)}$$

During the reversal of the moving direction, the motor end position changes stepwise. Therefore, a tracking error in the form of a step response of the transfer function 1−Gf(s) appears in the position feedback.

The position feedback is added to the position command in the servo control unit 7. Therefore, by adding, to the position command, an error correction amount equivalent to the tracking error that occurs in the position feedback during the reversal of the moving direction, the servo control apparatus 200 can reduce the tracking error with respect to the position command of the machine end position even when dual feedback control is used. That is, according to the second embodiment, in order to reduce the tracking error with respect to the position command of the machine end position during the reversal of the moving direction, the time constant Tc of the correction amount filter 75 is set to be equal to the time constant Tf of the position feedback filter 74.

As explained above, according to the second embodiment, the servo control unit 7 includes the position feedback filter 74 that calculates a low-frequency component of the difference between the detection value of the machine end position and the detection value of the motor end position; the correction amount filter 75 that calculates a high-frequency component of the error correction amount; the position control unit 71 that applies the predetermined position control operation to the value obtained by subtracting the sum of the output of the position feedback filter 74 and the detection value of the motor end position from the sum of the position command and the output of the correction amount filter 75; the differential operation unit 33 that differentiates the detection value of the motor end position; and the velocity control unit 32 that applies the predetermined velocity control operation to the difference between the output of the position control unit 71 and the output of the differential operation unit 33 and then calculates a torque command. Consequently, the servo control apparatus 200 in the second embodiment can realize dual feedback control in order to attain both the positioning accuracy of the machine end during the stopping and stability during the movement even when the rigidity of the machine system 6 is low. Furthermore, the servo control apparatus 200 can reduce the tracking delay of the machine end caused by the dual feedback control and sufficiently reduce the tracking error with respect to the position command of the machine end position that occurs after the moving direction reversal.

Note that the correction amount filter 75 has the characteristics of a high-pass filter; the position feedback filter 74 has the characteristics of a low-pass filter; and the time constant of the correction amount filter 75 and the time constant of the position feedback filter 74 are substantially the same. Consequently, it is possible to reduce the tracking delay of the machine end caused by the dual feedback control and sufficiently reduce the tracking error with respect to the position command of the machine end position that occurs after the moving direction reversal.

In the embodiments explained above, if the input and output relations among the components included in the servo control apparatuses 100 and 200 are equivalent, any one of the order of the addition and the subtraction and the arrangement of the components or both can be interchanged. For example, the servo control unit 3 adds the output of the correction-amount differential operation unit 34 to the output of the position control unit 31 and thereafter subtracts the output of the differential operation unit 33 from the sum of the output of the position control unit 31 and the output of the correction-amount differential operation unit 34. However, the servo control unit 3 can subtract the output of the differential operation unit 33 from the output of the position control unit 31 and thereafter add the output of the correction-amount differential operation unit 34 to the difference between the output of the differential operation unit 33 and the output of the position control unit 31, or it can subtract, from the output of the position control unit 31, a value obtained by subtracting the output of the correction-amount differential operation unit 34 from the output of the differential operation unit 33.

In the embodiments explained above, the machine deviation between the machine end position and the motor end position is caused by backlash. However, in lost motion, in which machine deviation depending on the moving direction occurs, the machine deviation can be caused by other factors. For example, when an elastic characteristic is present between the machine end position and the motor end position and friction is applied to the machine end position, a shift (lost motion) occurs in the machine end position between the positive direction movement time and the negative direction movement time. In such a case, a lost motion amount (a shift of the machine end position that occurs when positioning is performed in the same position from the positive direction and the negative direction) is set as a parameter. Consequently, it is possible to reduce the tracking error of the machine end position during the moving direction reversal as in the embodiments explained above.

A part or all of the components configuring the servo control apparatuses 100 and 200 can be realized by software or can be realized by hardware. To realize the components with software is to realize the functions of the components by having a computer including an arithmetic unit and a storage device store program modules corresponding to the components in the storage device in advance and the arithmetic unit executing the program modules stored in the storage device. Whether the components are realized as hardware or realized as software is determined according to the design restrictions imposed on the entire apparatus.

INDUSTRIAL APPLICABILITY

As explained above, the servo control apparatus according to the present invention is appropriately applied to the servo control apparatus that drives the servomotor.

REFERENCE SIGNS LIST

1 Model-response calculating unit
2 Error-correction-amount calculating unit
3 Servo control unit
4 Motor-end-movement-amount-during-stopping measuring unit
5 Motor
6 Machine system
7 Servo control unit
21 Code calculating unit
22 Error-correction-amount output unit
31, 71 Position control units
32 Velocity control unit
33 Differential operation unit
34 Correction-amount differential operation unit
41 Position-control simulating unit
42 Integrator
51 Servomotor
52 Motor-end-position detector
62 Nut
63 Table
64 Machine-end-position detector
74 Position feedback filter
75 Correction amount filter
100, 200 Servo control apparatus

The invention claimed is:
1. A servo control apparatus comprising:
a servo control unit that calculates, using a detection value of a machine end position, which is a position of a machine system, and a detection value of a motor end position, which is a position of a motor that drives the machine system as a position feedback, a torque command for the motor such that the machine end position follows a position command;
a model-response calculating unit that calculates a calculated value of the machine end position on the basis of the position command;
a motor-end-movement-amount-during-stopping measuring unit that determines a point in time when the calculated value of the machine end position indicates that a calculated velocity of the machine end position changes to a state of velocity zero and measures a motor end movement amount during stopping, which is a displacement amount of the detection value of the motor end position in a period from the point in time until an absolute value of the calculated velocity of the machine end position changes to a value larger than a threshold of velocity set in advance, wherein the state of velocity zero is defined as a state during which the absolute value of the calculated velocity of the machine end position is equal to or smaller than the threshold of velocity set in advance continues for time equal to or larger than a threshold of time; and an error-correction-amount calculating unit that calculates an error correction amount on the basis of
- a parameter that is set in advance as a maximum change amount of a deviation between the machine end position during reversal of a moving direction of a feed shaft and the motor end position,
- the calculated value of the machine end position, and
- the motor end movement amount during stopping, wherein the servo control unit includes:
- a position control unit that applies a position control operation set in advance to a difference between the position command and the detection value of the machine end position;
- a correction-amount differential operation unit that differentiates the error correction amount;
- a motor end position differential operation unit that differentiates the detection value of the motor end position; and
- a velocity control unit
  - that applies a velocity control operation set in advance to a difference between a value obtained by adding an output of the correction-amount differential operation unit to an output of the position control unit and an output of the motor end position differential operation unit and
  - that calculates the torque command.

2. The servo control apparatus according to claim 1, wherein
the error-correction-amount calculating unit
  - calculates a sign of velocity of the machine end on the basis of the calculated value of the machine end position, and,
  - when the calculated sign changes, changes the error correction amount in a direction of the calculated sign at a step width of a value obtained by subtracting the motor end movement amount during stopping from the parameter.

3. A servo control apparatus comprising:
a servo control unit that calculates, using a detection value of a machine end position, which is a position of a machine system, and a detection value of a motor end position, which is a position of a motor that drives the machine system as a position feedback, a torque command for the motor such that the machine end position follows a position command;
a model-response calculating unit that calculates a calculated value of the machine end position on the basis of the position command;
a motor-end-movement-amount-during-stopping measuring unit that determines a point in time when the calculated value of the machine end position indicates that a calculated velocity of the machine end position changes to a state of velocity zero and measures a motor end movement amount during stopping, which is a displacement amount of the detection value of the motor end position in a period from the point in time until an absolute value of the calculated velocity of the machine end position changes to a value larger than a threshold of velocity set in advance, wherein the state of velocity zero is defined as a state during which the absolute value of the calculated velocity of the machine end position is equal to or smaller than the threshold of velocity set in advance continues for time equal to or larger than a threshold of time; and an error-correction-amount calculating unit that calculates an error correction amount on the basis of
- a parameter that is set in advance as a maximum change amount of a deviation between the machine end position during reversal of a moving direction of a feed shaft and the motor end position,
- the calculated value of the machine end position, and
- the motor end movement amount during stopping, wherein the servo control unit includes:
- a position feedback filter that calculates a low-frequency component of a difference between the detection value of the machine end position and the detection value of the motor end position;
- a correction amount filter that calculates a high-frequency component of the error correction amount;
- a position control unit that applies a position control operation set in advance to a value obtained by subtracting a sum of an output of the position feedback filter and the detection value of the motor end position from a sum of the position command and an output of the correction amount filter;
- a motor end position differential operation unit that differentiates the detection value of the motor end position; and
- a velocity control unit
  - that applies a velocity control operation set in advance to a difference between an output of the position control unit and an output of the motor end position differential operation unit and
  - that calculates the torque command.

4. The servo control apparatus according to claim 3, wherein
the error-correction-amount calculating unit
  - calculates a sign of velocity of the machine end on the basis of the calculated value of the machine end position, and,
  - when the calculated sign changes, changes the error correction amount in a direction of the calculated sign at a step width of a value obtained by subtracting the motor end movement amount during stopping from the parameter.

5. The servo control apparatus according to claim 3, wherein
the correction amount filter is a high-pass filter,
the position feedback filter is a low-pass filter, and
a time constant of the correction amount filter and a time constant of the position feedback filter are equal.

* * * * *